(12) United States Patent
Xia et al.

(10) Patent No.: US 10,788,862 B2
(45) Date of Patent: Sep. 29, 2020

(54) FLEXIBLE DISPLAY DEVICE AND UNFOLDING DETECTION METHOD THEREOF

(71) Applicant: SHENZHEN ROYOLE TECHNOLOGIES CO. LTD., Shenzhen (CN)

(72) Inventors: Xinyuan Xia, Shenzhen (CN); Jinhui Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/347,747

(22) PCT Filed: Nov. 9, 2016

(86) PCT No.: PCT/CN2016/105166
§ 371 (c)(1),
(2) Date: May 6, 2019

(87) PCT Pub. No.: WO2018/086001
PCT Pub. Date: May 17, 2018

(65) Prior Publication Data
US 2019/0286194 A1 Sep. 19, 2019

(51) Int. Cl.
*H05K 1/00* (2006.01)
*G06F 1/16* (2006.01)
*G09F 9/30* (2006.01)

(52) U.S. Cl.
CPC .......... *G06F 1/1652* (2013.01); *G06F 1/1616* (2013.01); *G09F 9/30* (2013.01); *G09F 9/301* (2013.01)

(58) Field of Classification Search
USPC ........................................................ 361/749
See application file for complete search history.

(56) References Cited

U.S. PATENT DOCUMENTS

| 2013/0314387 A1* | 11/2013 | Kwack | G09G 5/005 345/207 |
| 2016/0186959 A1* | 6/2016 | Kim | F21V 5/04 362/311.02 |

FOREIGN PATENT DOCUMENTS

| CN | 1833194 A | 9/2006 |
| CN | 102956151 A | 3/2013 |

(Continued)

OTHER PUBLICATIONS

International search report dated Aug. 2, 2017 from corresponding application No. PCT/CN2016/105166.

*Primary Examiner* — Andargie M Aychillhum
(74) *Attorney, Agent, or Firm* — Hauptman Ham, LLP (57) ABSTRACT

A flexible display device and an unfolding detection method. The flexible display device comprises a flexible display screen, an accommodating housing, and a first light emitting element and a first light sensing element which are disposed opposite to each other. The flexible display screen comprises a plurality of first basic units arranged along an unfolding direction of the flexible display screen. The method comprises: the first light sensing element receives light emitted by the first light emitting element and generates a first light sensing parameter; a processor receives the first light sensing parameter; the processor determines a first unfolding length corresponding to the first light sensing parameter according to a relationship table of light sensing parameters and unfolding lengths; and the processor determines the first unfolding length to be an unfolding length of the flexible display screen extending out from the accommodating housing.

18 Claims, 7 Drawing Sheets

(56) References Cited

FOREIGN PATENT DOCUMENTS

| | | | |
|---|---|---|---|
| CN | 103426384 | A | 12/2013 |
| CN | 104021749 | A | 9/2014 |
| CN | 104461444 | A | 3/2015 |
| CN | 104505005 | A | 4/2015 |
| TW | 201205155 | A | 2/2012 |

\* cited by examiner

| Light sensing parameters | Parameter range | Unfolding length |
|---|---|---|
| E1 | E1-E2 | X1 |
| E2 | E1-E2 | X1 |
| F1 | F1-F2 | X2 |
| F2 | F1-F2 | X2 |

FLEXIBLE DISPLAY DEVICE AND UNFOLDING DETECTION METHOD THEREOF

RELATED APPLICATION

The present application is a National Phase of International Application Number PCT/CN2016/105166, filed Nov. 9, 2016.

TECHNICAL FIELD

This present disclosure relates to a flexible display device, and more particularly, to a flexible display device and an unfolding detection method thereof.

BACKGROUND

Currently, scroll-type flexible display devices have emerged in certain market due to characters of the flexible display device, such as portability and the like, for its flexibility. However, the current scroll-type flexible display devices generally may not accurately detect unfolding length of the display screen of the flexible display device, and the detection method thereof is complicated.

SUMMARY

Embodiments of the present disclosure disclose a flexible display device and an unfolding detection method thereof, which can detect an unfolding degree of the display screen of the flexible display device via a simple structure.

Embodiments of the present disclosure disclose a flexible display device, which comprises a flexible display screen, an accommodating housing and a processor. The flexible display screen extending out from the accommodating housing or receiving in the accommodating housing, wherein, the flexible display further comprises a first light emitting element and a first light sensing element, the first light emitting element and the first light sensing element disposed at corresponding positions of the accommodating housing. The flexible display screen comprises a plurality of first basic units arranged along an unfolding direction of the flexible display screen and spaced apart from each other. Each of first basic units comprising a first light transmitting area with an area different from any other area of any other first basic unit. When any first light transmitting area moves with the flexible display screen and passes through the first light emitting element and the first light sensing element, the first light transmitting area is located between the first light emitting element and the first light sensing element. The first light sensing element senses light emitted by the first light emitting element passing through the first light transmitting area and generates a first light sensing parameter. The processor is coupled to the first light sensing element for receiving the first light sensing parameter. The processor determines a first unfolding length corresponding to the first light sensing parameter according to a preset first relationship table of light sensing parameters and unfolding lengths, and determines an unfolding length of the flexible display screen extending out from the accommodating housing to be the first unfolding length.

Embodiments of the present disclosure disclose a flexible display device, which comprises a flexible display screen, an accommodating housing and a processor. The flexible display screen extending out from the accommodating housing or receiving in the accommodating housing, wherein, the flexible display further comprises a first light emitting element, a second light emitting element, a first light sensing element and a second light sensing element. The first light emitting element and the first light sensing element are disposed at corresponding positions of the accommodating housing, and the second light emitting element and the second light sensing element are also disposed at another corresponding positions of the accommodating housing. The flexible display screen comprises a plurality of first basic units arranged along an unfolding direction of the flexible display screen and spaced apart from each other and a plurality of second basic units corresponding to the plurality of first basic units. Each of the first basic units comprising a first light transmitting area with an area different from any other area of any other first basic unit. Each of the second basic units comprising a second light transmitting area with an area same with any other area of any other second basic unit. Wherein, when any first light transmitting area of the first basic unit is moved to a position between the first light emitting element and the first light sensing element, the second light transmitting area of the second basic unit corresponding to the first basic unit is also moved to a position between the second light emitting element and the second light sensing element. The first light sensing element senses light emitted by the first light emitting element and passed through the first light transmitting area and generates a first light sensing parameter, and the second light sensing element senses light emitted by the second light emitting element and passed through the second light transmitting area and generates a second light sensing parameter. The processor is coupled to the first light sensing element and the second light sensing element, and is configured to receive the first light sensing parameter generated by the first light sensing element and the second light sensing parameter generated by the second light sensing element. The processor calculates a ratio of the first light sensing parameter to the second light sensing parameter to obtain a parameter ratio, and further determines an unfolding length corresponding to the parameter ratio according to a relationship table of parameter ratios and unfolding lengths, thereby determining that an unfolding length of the flexible display screen extending out from the accommodating housing to be the unfolding length.

Embodiments of the present disclosure disclose an unfolding detection method, configured to detect an unfolding length of a flexible display screen of a flexible display device. Wherein, the flexible display device comprises a first light emitting element and a first light sensing element disposed at corresponding positions of the flexible display device. The flexible display screen is provided with a plurality of first basic units arranged along an unfolding direction of the flexible display screen, and each of the first basic units comprising a first light transmitting area with an area different from any other area of any other first basic unit. The method comprises steps of: when the first light transmitting area of any first basic unit is moved to a position between the first light emitting element and the first light sensing element, receiving, performed by the first light sensing element, light emitted by the first light emitting element and generating a first light sensing parameter; receiving the first light sensing parameter generated by the first light sensing element; determining a first unfolding length corresponding to the first light sensing parameter according to a relationship table of light sensing parameters and unfolding lengths; determining the first unfolding length to be an unfolding length of the flexible display screen extending out from the accommodating housing.

Embodiments of the present disclosure disclose an unfolding detection method, configured to detect a unfolding length of a flexible display screen of a flexible display device. Wherein, the flexible display device comprises a first light emitting element and a first light sensing element disposed at corresponding positions of the flexible display device, and further comprises a second light emitting element and a second light sensing element disposed at corresponding positions of the flexible display device. The flexible display screen comprises a plurality of first basic units arranged along an unfolding direction of the flexible display screen and spaced apart from each other and a plurality of second basic units corresponding to the plurality of first basic units, each first basic unit comprises a first light transmitting area and the sizes of all the first light transmitting areas are different, and each second basic unit comprises a second light transmitting area and the sizes of all the second light transmitting areas are the same. The method comprises steps of: when the first light transmitting area of any first basic unit is moved to a position between the first light emitting element and the first light sensing element, the first light sensing element receives light emitted by the first light emitting element and generates a first light sensing parameter; the second light sensing element receives light emitted by the second light emitting element and generates a second light sensing parameter, when the corresponding second basic unit is moved to a position between the second light emitting element and the second light sensing element; receiving the first light sensing parameter and the second light sensing parameter; calculating a ratio of the first light sensing parameter to the second light sensing parameter to obtain a parameter ratio; determining an unfolding length corresponding to the parameter ratio according to a relationship table of the parameter ratios and unfolding lengths; and determining an unfolding length as an unfolding length of the flexible display screen extending out from the accommodating housing.

BRIEF DESCRIPTION OF THE ACCOMPANYING DRAWINGS

To describe technology solutions in the embodiments of the present disclosure more clearly, the following briefly introduces the accompanying drawings required for describing the embodiments. Obviously, the accompanying drawings in the following description show merely some embodiments of the present disclosure. Those of ordinary skill in the art may also derive other obvious variations according to these accompanying drawings without creative efforts.

DETAILED DESCRIPTION OF ILLUSTRATED EMBODIMENTS

The technical solution in the embodiments of the present disclosure will be described clearly and completely hereinafter with reference to the accompanying drawings in the embodiments of the present disclosure. Obviously, the described embodiments are merely some but not all the embodiments of the present disclosure. All other embodiments obtained by a person of ordinary skill in the art according to the embodiments of the present disclosure without creative efforts shall all fall within the protection scope of the present disclosure.

Figure 1:
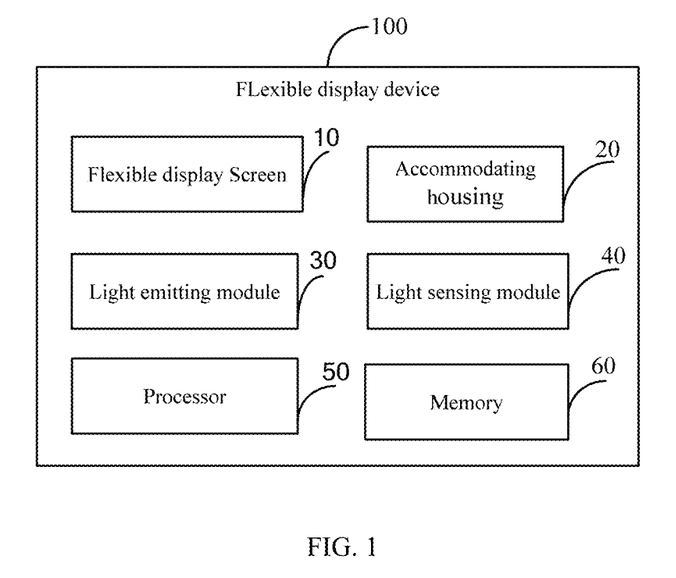
FIG. 1 is a structural block diagram of an flexible display device according to one embodiment of the present disclosure.

Referring to FIG. 1, a structural block diagram of a flexible display device 100 according to one embodiment of the present disclosure is provided. The flexible display device 100 includes a flexible display screen 10, an accommodating housing 20, a light emitting module 30, a light sensing module 40 and a processor 50. The flexible display screen 10 can be curled and received in the accommodating housing 20 or extend out from the accommodating housing 20.

Figure 2:
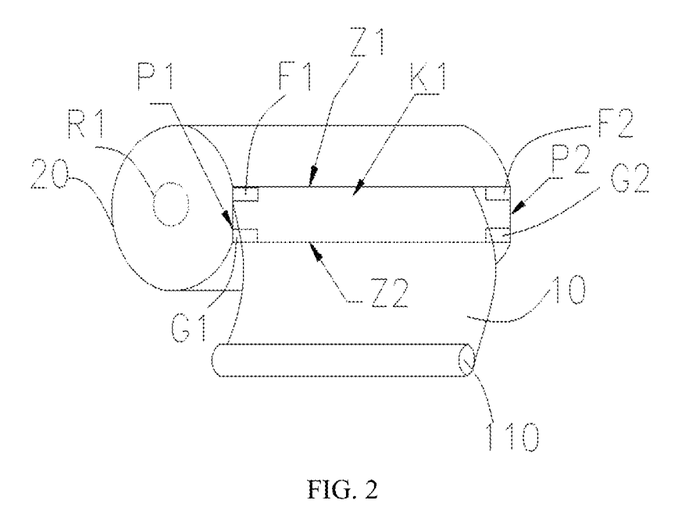
FIG. 2 is a schematic diagram of a flexible display device viewed from one aspect according to one embodiment of the present disclosure.

Referring to FIG. 2, a schematic diagram of the flexible display device 100 viewed from one aspect is provided. The light emitting module 30 includes a first light emitting element F1, the light sensing module 40 includes a first light sensing element G1. The first light emitting element F1 and the first light sensing element G1 are disposed at corresponding positions of the accommodating housing 20, and the first light emitting element F1 is configured to emit light toward the direction of the first light sensing element G1.

Figure 3:
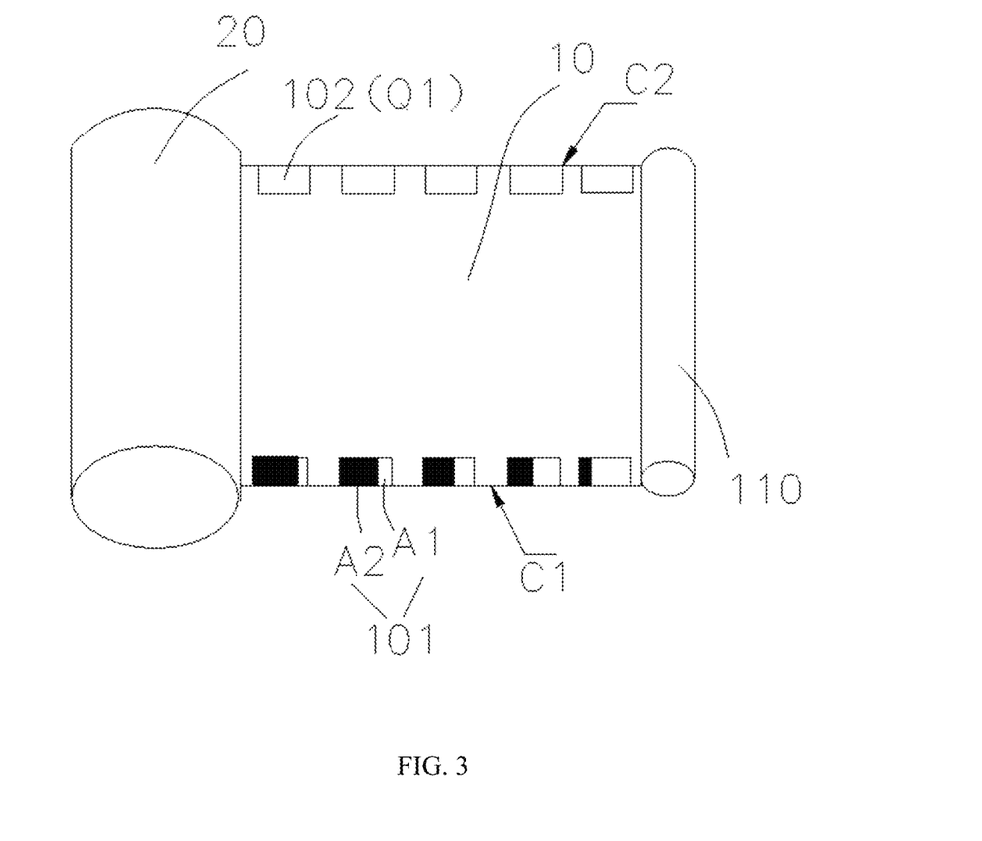
FIG. 3 is a schematic diagram of which a flexible display screen of a flexible display is extended according to one embodiment of the present disclosure.

Referring to FIG. 3 together, a schematic diagram of top view of the flexible display screen 10 extending from the accommodating housing 20 is provided. The flexible display screen 10 includes a plurality of first basic units 101 arranged along an unfolding direction of the flexible display screen 10 and spaced apart from each other. The first basic unit 101 includes a first light transmitting area A1, and an area of the first light transmitting area A1 of each first basic unit 101 is different. When one of the first light transmitting area A1 moves with the flexible display screen 10 through the first light emitting element F1 and the first light sensing element G1, the first light transmitting area A1 is located between the first light emitting element F1 and the first light sensing element G, the light transmitting area A1 is configured to transmit light emitted by the first light emitting element F1 to the first light sensing element G1. The first light sensing element G1 senses light emitted by the first light emitting element F1 passing through the first light transmitting area A1 and generates a first light sensing parameter.

Since the sizes of the first light transmitting areas A1 of different first basic units 101 are different, an amount of light passing through the first light transmitting areas A1 of different first basic units 101 moving to the opening K1 are different, that is, the amount of light emitted by the first light emitting element F1 to be transmitted to the first light sensing element G1 are different. Therefore, the amount of light received by the first light sensing element G1 are also different, thus, different first light sensing parameters are generated.

The processor 50 is coupled to the first light sensing element G1 for receiving the first light sensing parameter. The processor 50 determines an unfolding length D1 corresponding to the received first light sensing parameter according to a preset relationship table of the light sensing parameter and unfolding length, and determines an unfolding length of the flexible display screen 10 extending out from the accommodating housing 20 to be the unfolding length D1.

Thus, in the present disclosure, by setting the first light transmitting areas A1 with different sizes, when the flexible display screen 10 is moved to different positions, one of the first light transmitting areas A1 with different sizes is located between the first light emitting element F1 and the first light sensing element G1. The first light sensing element G1 generates different light sensing parameters for the amount of received light are different, thus indicating different unfolding lengths of the flexible display screen 10.

In some embodiments, the first light sensing parameter generated by the first light sensing element G1 and the unfolding length of the current flexible display screen 10 can be measured, each time the first light transmitting area A1 of each first basic unit 101 passes through the first light sensing element G1. Thus, the relationships between different light sensing parameters and different unfolding lengths are determined one by one, and the relationship table T1 is formed accordingly.

Figure 4:
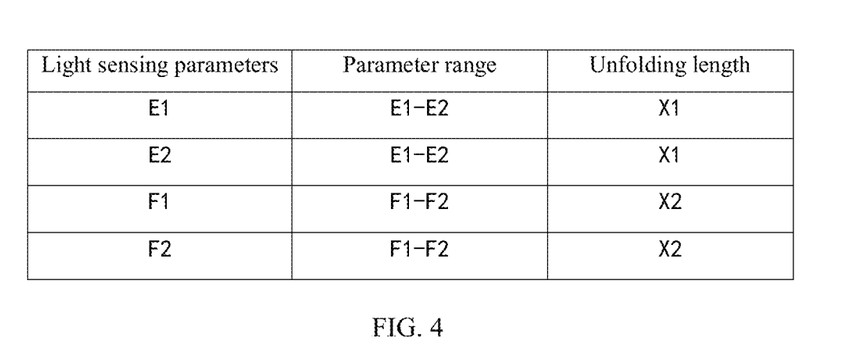
FIG. 4 is a relationship table of light sensing parameters and unfolding lengths according to one embodiment of the present disclosure.

Referring to FIG. 4 together, a schematic diagram of the corresponding relation table T1 is provided. In some embodiments, the relationship table T1 includes relationships between light sensing parameters, parameter ranges, and unfolding lengths. The processor 50 determines a range of light sensing parameters in which the first light sensing parameter is located according to the received light sensing parameter, and further determines a corresponding unfolding length according to the range of the light sensing parameters. Such as, as the relationship table T1 shown in FIG. 5, the light sensing parameters E1 and E2 correspond to the parameter ranges E1 to E2, and both correspond to the unfolding length X1.

In some embodiments, the first light sensing parameter generated by the first light sensing element G1 can be detected more than once, each time the first light transmitting area A1 of each first basic unit 101 passes through the first light sensing element G1, and the unfolding length of the current flexible display screen 10 can be measured also. Thereby a plurality of light sensing parameters corresponding to one same unfolding length are determined, and a relationship between one range of the light sensing parameters and the unfolding length is obtained accordingly. Such that, the relationships between different range of light sensing parameters and different unfolding lengths are determined one by one through multiple detection results, and the relationship table T1 is formed.

Therein, the relationship table T1 can be pre-burned in the processor 50. As shown in FIG. 1, the flexible display device 100 can further include a memory 60, and the corresponding relation table T1 may be stored in the memory 60.

Since is the range of the light sensing parameter to be corresponded to the unfolding length, the deviation is further avoided.

In some embodiments, areas of the first light transmitting areas A1 of the plurality of first basic units 101 differ in ascending or descending order along the unfolding direction of the flexible display screen 10. In other embodiments, areas of the first light transmitting areas A1 of the plurality of first base units 101 differ without sequence, as long as the sizes of the first light transmitting areas A1 of different first base units 101 are different.

Referring back to FIG. 2 and FIG. 3, as shown in FIG. 2, the light emitting module 30 further includes a second light emitting element F2 and the light sensing module 30 further includes a second light sensing element G2. the second light emitting element F2 and the second light sensing element G2 are also disposed at corresponding positions of the accommodating housing 20. The flexible display screen 10 further includes second basic units 102 arranged along the unfolding direction of the flexible display screen 10 and spaced apart from each other. The plurality of second basic units 102 each includes a second light transmitting area Q1, and sizes of the second light transmitting areas Q1 of all second basic units 102 are the same. The plurality of second basic units 102 are arranged on the flexible display screen 10 in parallel with the plurality of first basic units 101 and correspond to the the plurality of first basic units 101 one by one. When the first light transmitting area A1 of the first basic unit 101 is moved to a position corresponding to the first light emitting element G1 of the accommodating housing 20, the second light transmitting area Q1 of the second basic unit 102 corresponding to the first basic unit 101 is also moved to a position corresponding to the corresponding second light sensing element G2. That is, the second light transmitting area Q1 of the second basic unit 102 corresponds to the second light emitting element F2 and the second light sensing element G2, namely, is located between the second light emitting element F2 and the second light sensing element G2, and is configured to transmit light emitted by the second light emitting element F2 to the second light sensing element G2.

With the process that flexible display screen 10 extends out from the accommodating housing 20 or receives into the accommodating housing 20, when the first basic unit 101 passes through the first light emitting element F1 and the first light sensing element G1, the second basic unit 102 corresponding to the first basic unit 101 also passes through the second light emitting element F2 and the second light sensing element G2. As mentioned above, when the first light transmitting area A1 is moved to a position corresponding to the first light emitting element F1 and the the first light sensing element G1, namely a position between the first light emitting element F1 and the first light sensing element G1, the first light transmitting area A1 is configured to transmit light emitted by the first light emitting element F1 to the first light sensing element G1. The first light sensing element G1 senses light emitted by the first light emitting element F1 and passed through the first light transmitting area A1 and generates a first light sensing parameter.

Similarly, when the second basic unit 102 is moved to a position corresponding to the second light emitting element F2 and the second light sensing element G2, the second light transmitting area Q1 is configured to transmit light emitted by the second light emitting element F2 to the second light sensing element G2. The second light sensing element G2 senses light emitted by the second light emitting element F2 and generates a second light sensing parameter.

The processor 50 is further coupled to the second light sensing element G2 for simultaneously receiving the first light sensing parameter generated by the first light sensing element G1 and the second light sensing parameter generated by the second light sensing element G2.

The processor 50 calculates a ratio of the first light sensing parameter to the second light sensing parameter to obtain a parameter ratio, and further determines an unfolding length D2 corresponding to the parameter ratio according to a relationship table of parameter ratios and unfolding lengths.

The processor 50 compares the unfolding length D1 obtained according to the light sensing parameter with the unfolding length D2 obtained according to the parameter ratio to determine whether the unfolding length D1 is equal to the unfolding length D2 or not, if not, the processor 50 modifies the unfolding length D1 as the unfolding length D2, that is, the unfolding length D2 is determined to be a standard unfolding length of the currently flexible display screen 10 extending out from the accommodating housing 20. In some embodiments, the processor 50 directly determines the unfolding length D2 as the unfolding length of the flexible display screen 10 extending out from the accommodating housing 20 without comparing with the unfolding length D1.

Obviously, the processor 50 determines any one of the unfolding length D1 or the unfolding length D2 as the unfolding length of the flexible display screen 10 extends out from the accommodating housing 20, when the unfolding length D1 is equal to the unfolding length D2. In some embodiments, when a lower precision is allowed, the processor 50 also can determine any one of the unfolding length D1 or the unfolding length D2 as the unfolding length of the flexible display screen 10 extends out from the accommodating housing 20 even if the unfolding length D1 is not equal to the unfolding length D2.

In some embodiments, the parameter ratio of the first light sensing parameter generated by the first light sensing element G1 to the second light sensing parameter generated by the second light sensing element G2 can be detected more than once, each time the first light transmitting area A1 of each first basic unit 101 passes through the first light sensing element G1 and the second light transmitting area Q1 of each second basic unit 102 passes through the second light sensing element G2, and the current unfolding length of the flexible display screen 10 can be measured also. Such that, relationships between different parameter ratios and different unfolding lengths are determined one by one through multiple detection results and the relationship table of parameter ratios and unfolding lengths is formed.

Therein, when the flexible display screen 10 is extended out from the accommodating housing 20 or received into the accommodating housing 20, the first basic unit 101 and the corresponding second basic unit 102 pass through the corresponding light sensing elements simultaneously. Assuming that the flexible display screen 10 is moved at a speed V under an external force, a moving speed of the first basic unit 101 passing through the first light emitting element F1 and a moving speed of corresponding second basic unit 102 passing through the second light emitting element F2 are the same, both of which are the speed V.

Assuming duration when the first basic unit 101 and the corresponding second basic unit 102 pass through the corresponding light sensing elements are t, a duration when the first light transmitting area A1 of the first basic unit 101 pass through the first light sensing element G1 is T.

Assuming that a length of the first light transmitting area A1 of the first basic unit 101 is L1 and a length of the second light transmitting area Q1 of the second basic unit 102 is L2, then a formulate $T/t=(L1N)/(L2/V)=L1/L2$ is obtained.

Assuming a width of the first light transmitting area A1 is W1, the size of the first light transmitting area A1 is $S1=L1*W1$. Assuming a width of the second basic unit 102 is W2, the area size of the second light transmitting area Q1 of the second basic unit 102 is $S2=L2*W2$.

Thus, $T/t=L1/L2=(S1/W1)/(S2/W2)=S1*W2/S2*W1$.

From the above, it can be found that the ratio of the size S1 of the first light transmitting area A1 to the size S2 of the second light transmitting area Q1 can be expressed by the ratio of T to t (W2/W1 is a constant coefficient), that is, the ratio of T to t is a value independent of the moving speed of the flexible display screen 10.

Since a light amount ratio of the amount of light received by the first light sensing element G1 to the amount of light received by the second light sensing element G2 is equal to a size ratio of the area sizeS1 of the first light transmitting area A1 to the area size S2 of the second light transmitting area Q1, that is also a value independent of the moving speed of the flexible display screen 10.

Thus, the parameter ratio of the first light sensing parameter generated by the first light sensing element G1 to the second light sensing parameter generated by the second light sensing element G2 is equal to the light amount ratio, is also independent of the moving speed of the flexible display screen 10, only relevant to the size ratio of the size S1 of the first light transmitting area A1 to the size S2 of the second light transmitting area Q1.

Since sizes S1 of the first light transmitting areas A1 of all first basic units 101 are different, and sizes S2 of the second light transmitting areas Q1 of all second basic units 102 are the same, when different first basic units 101 and the corresponding second basic units 102 pass the corresponding light sensing elements respectively, the parameter ratio is unique.

Therefore, no matter how fast or slow the flexible display 10 is pulled, and no matter whether constant or variable the speed is in the process of pulling the flexible display 10, the unfolding length D2 obtained by the processor 50 according to the parameter ratio will not be effected and the unfolding length D2 obtained according to the parameter ratio can be a more accurate value.

In some embodiments, the processor 50 calculates a ratio of the first light sensing parameter to the second light sensing parameter to obtain a parameter ratio, and determines the unfolding length corresponding to the parameter ratio according to the relationship table of parameter ratios and the unfolding lengths. The unfolding length corresponding to the parameter ratio directly determined to be the length of the flexible display screen 10 extending out from the accommodating housing 20.

As shown in FIG. 3, in an embodiment, the flexible display screen 10 includes a first edge C1 along the unfolding direction of the flexible display screen 10, and the plurality of first basic units 101 are arranged on the first edge C1 and spaced apart from each other. As shown in FIG. 3, the flexible display screen 10 further includes a second edge C2 corresponding to the first edge C1 along the unfolding direction of the flexible display screen 10, the plurality of second basic units 102 are arranged arranged on the second edge C2 and spaced apart from each other. When the flexible display screen 10 is extended out from the accommodating housing 20 or received into the accommodating housing 20, a virtual connection line of the plurality of first basic units 101 is corresponded to the first light emitting element F1 and the first light sensing element G1, and a virtual connection line of the the plurality of second basic units 102 is corresponded to the second light emitting element F1 and the second light sensing element G1.

Figure 5:
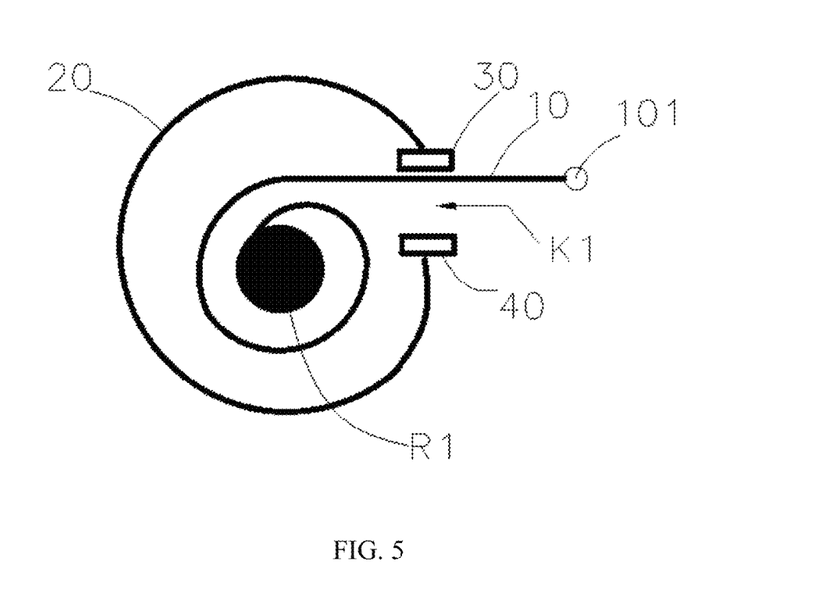
FIG. 5 is a cross-sectional diagram of a flexible display device according to one embodiment of the present disclosure.

Referring to FIG. 2 together, as shown in FIG. 5 and FIG. 2, in an embodiment, the accommodating housing 20 includes an opening K1, the flexible display screen 10 extending out from the accommodating housing 20 or receiving into the accommodating housing 20 through the opening K1. The first light emitting element F1 and the first light sensing element G1 disposed at corresponding positions of the opening K1. As shown in FIG. 2, the first light emitting element F1 and the first light sensing element G1 are disposed at corresponding positions of the first side Z1 and the second side Z2 of the opening K1. The second light emitting element F2 and the second light sensing element G2 are disposed at another corresponding positions of the first side Z1 and the second side Z2 of the opening K1. Specifically, the first light emitting element F1 and the first light sensing element G1 are respectively disposed at first ends P1 of the first side Z1 and the second side Z2 of the opening K1. The second light emitting element F2 and the second light sensing element G2 are also respectively arranged at second ends P2 of the the first side Z1 and the second side Z2 of the opening K1.

The direction of a virtual connection line of the first light emitting element F1 and the first light sensing element G1 is perpendicular to the direction of the flexible display screen 10 extending out from the opening K1. When the flexible display screen 10 passes through the opening K1, the first light emitting element F1 and the first light sensing element G1 are respectively face to a upper surface and a lower surface of the flexible display screen 10. With a process that the flexible display screen 10 extending out from or receiving into the accommodating housing 20, when the first light transmitting area A1 of the first basic unit 101 passes through the first light emitting element F1 and the first light sensing element G1, the light emitted by the first light emitting element F1 is transmitted to the first light sensing element G1 by the first light transmitting area A1 of the first basic unit 101. The first light sensing element G1 senses light emitted by the first light emitting element F1 and generates the first light sensing parameter. When any one of the second light transmitting areas Q1 of the second basic units 102 is moved to a position corresponding to the second light emitting element F2 and the second light sensing element G2, the second light transmitting area Q1 of the the second basic unit 102 is configured to transmit light emitted by the second light emitting element F2 to the second light sensing element G2. The second light sensing element G2 senses light emitted by the second light emitting element F2 and generates a second light sensing parameter.

In FIG. 2, which shows that the second light emitting element F2 and the second light sensing element G2 are arranged at the second ends P2 of the first side Z1 and the second side Z2 of the opening K1, the plurality of second basic units 102 are disposed on the second edge C2. Obviously, the second basic unit 102 also can be disposed at the same edge in parallel with the first basic units 101, such as, the second basic unit 102 also can be disposed at the first edge C1 in parallel with the first basic units 101. The second light emitting element F2 and the second light sensing element G2 may be disposed in parallel with the first light emitting element F1 and the first light sensing element G1 at the same ends of the first side Z1 and the second side Z2 of the opening K1. That is, the first light emitting element F1 and the first light sensing element G1 are respectively disposed at the first end P1 or the second end P2 of the first side Z1 and the second side Z2, the second light emitting element F2 and the second light emitting element G2 are respectively arranged in parallel with the first light emitting element F1 and the first light emitting element G1 at the first ends P1 or the second end P2 of the first side Z1 and the second side Z2.

The second basic unit 102 and the first basic unit 101 also can be arranged at other positions of the flexible display screen 10 along the unfolding direction of the flexible display screen 10. The first light emitting element F1, the first light sensing element G1, the second light emitting element F2 and the second light sensing element G2 also can be arranged at opposite sides of other positions of the opening K1, as long as satisfy that when the first basic unit 101 is moved to a position corresponding to the first light emitting element F1 and the first light sensing element G1, the second basic unit 102 corresponding to the first basic unit 101 also is moved to a position corresponding to the second light emitting element F2 and the second light sensing element G2.

Therein, as shown in FIG. 3, each of the first basic units 101 further includes an opaque area A2. A sum size of the the first light transmitting area A1 and the opaque area A2 of the first basic unit 101 is substantially equal to a size of the second basic unit 102 corresponding to the first basic units 101. Thus, when setting the first basic unit 101 and the second basic unit 102 it is conveniently to adjust. Obviously, in other embodiments, each of the first basic units 101 can include the first light transmitting area A1 merely, and does not include the opaque area A2. As shown in FIG. 3, each of the second basic units 102 includes the second light transmitting area Q1 merely. Obviously, in other embodiments, each of the second basic units 102 can also include an opaque area.

In an embodiment, the first light emitting element F1 and the second light emitting element F2 are light emitting diodes or laser diodes, and the emitted light is infrared light or visible light. The first light sensing element G1 and the second light sensing element G1 are photodiodes, and the first light sensing parameter and the second light sensing parameter are current parameters or voltage parameters. When the first light sensing element G1 and the second light sensing element G1 receive different amounts of light, the generated currents or voltages are different, thus, the processor 50 can determine a corresponding unfolding length according to the corresponding relationship mentioned above.

Therein, when the first light emitting element F1 and the second light emitting element F2 are laser diodes, the influence of ambient light is smaller due to the larger luminous intensity, thus, the first light sensing element G1 and the second light sensing element G1 can be disposed at mouth of the opening K1 as shown in FIG. 2.

Figure 6:
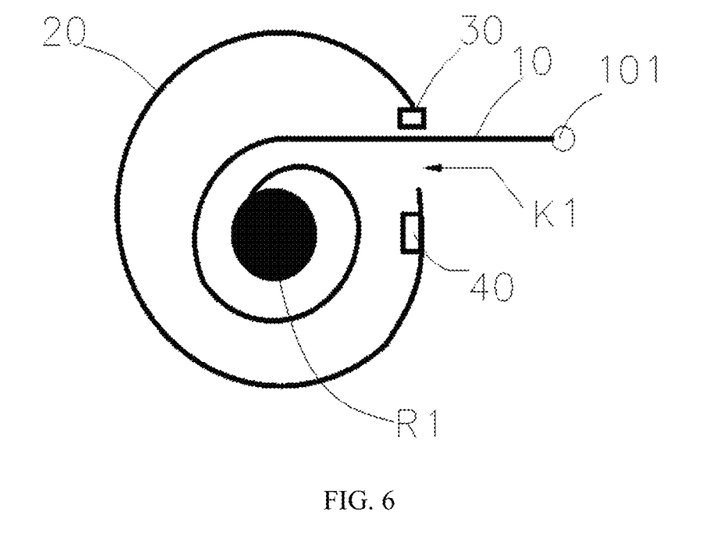
FIG. 6 is a cross-sectional diagram of a flexible display device according to another embodiment of the present disclosure.

Referring to FIG. 6 together, in other embodiments, the first light sensing element G1 and the second light sensing element G2 are disposed at an inner sidewall of the accommodating housing 20 adjacent to the opening K1 to avoid influence of the ambient light, thus, the detection accuracy can be higher, no matter the first light emitting element F1 and the second light emitting element F2 are ordinary light emitting diodes or laser diodes.

Figure 7:
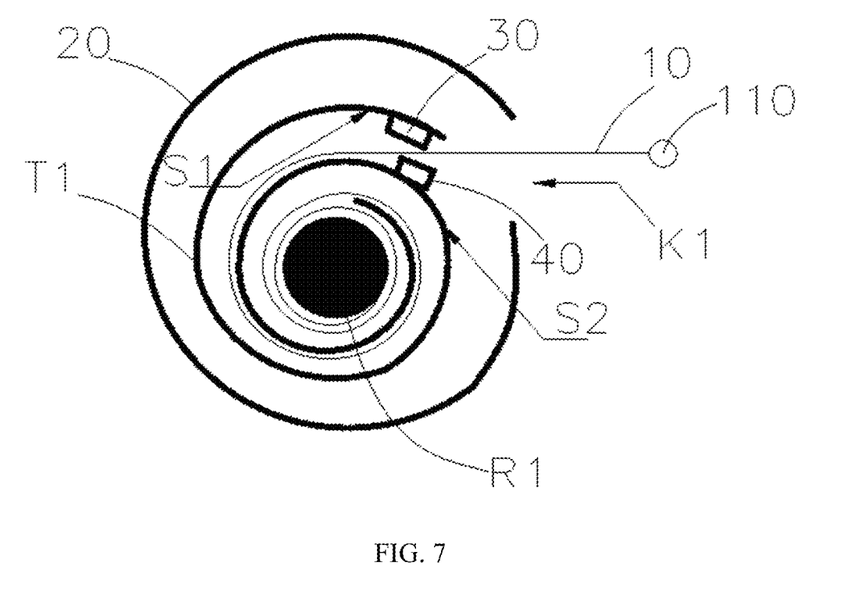
FIG. 7 is a cross-sectional diagram of a flexible display device according to another embodiment of the present disclosure.

Referring to FIG. 7 together, in other embodiments, the accommodating housing 20 further includes a winding-shape accommodating passage T1 located in the accommodating housing 20; the flexible display screen 10 is received in the accommodating housing 20 through accommodating passage T1. The first light emitting element F1 and the first light sensing element G1 are disposed at corresponding positions of first sides of opposite surfaces S1, S2 of the accommodating passage T1, the second light emitting element F2 and the second light sensing element G2 are respectively arranged in parallel with the first light emitting element F1 and the first light sensing element G1 at corresponding positions of the first sides of the opposite surfaces, or the second light emitting element F2 and the second light sensing element G2 are disposed, opposite to each other, on second sides of the opposite surfaces S1, S2 respectively, further, the first sides being opposite to the second sides. Therein, the accommodating passage T1 is made of winding plastic material, resin material, metal material, or the like.

Therein, the first light transmitting area A1 of the first basic unit 101 are made of light transmitting materials, such as transparent plastic material and transparent resin material, or formed by perforating holes. The second light transmitting area Q1 of each second basic unit 102 is made of light transmitting material or the whole second basic unit 102 also is a perforating hole.

In some embodiments, the processor 50 further determines a size of a visible display area/unfolding area of the flexible display screen 10 according to the unfolding length of the current flexible display screen 10, and adjusts a size of a display content to match the size of the current visible display area, such as scaling the display content to fit the size of the current visible display area. Specifically, the processor 50 can calculate the size of the visible display area/unfolding area of the flexible display screen 10 according to the unfolding length of the current flexible display screen 10 and the width W of the flexible display screen 10. Obviously, the width W of the flexible display screen 10 is an invariable known value, once the unfolding length is obtained, the size of the visible display area/unfolding area can be calculated by multiplying the unfolding length by the width W.

Thus, when the flexible display screen 10 plays a certain display content, the display size of the flexible display screen 10 can be adjusted by users, such as, the flexible display screen 10 can be extended more out from the accommodating housing 20 or accommodated more into the accommodating housing 20. Processor 50 can determine the size of the current visible display area according to the current unfolding length and adjust the size of the display content, thus, the display content can still be displayed fully in the current visible display area.

The processor 50 also can adjust a resolution of the display content according to the size of the visible display area, thus, the display content can be clearly displayed in the visible display area.

The flexible display screen 10 can be a display screen such as an OLED flexible display screen or an electronic paper flexible display screen. In some embodiments, the flexible display screen 10 also can be a flexible touch display screen integrating with a touch input function.

The processor 50 can be a central processing unit, a microcontroller, a single chip microcomputer, a digital signal processor, or the like. The memory 60 can be a flash memory, a solid state memory, a read only memory, a erasable and readable memory, or the like.

Wherein the flexible display 100 also can include other elements, such as a sound playback unit, a microphone (sound input unit), or the like, the flexible display 100 can be used as a intelligent portable terminal.

Wherein, as shown in FIG. 2 or FIG. 3, the flexible display 100 further includes a rotating shaft R1 extending from the accommodating housing 20 and extending into inside of the accommodating housing 20, one side of the flexible display screen 10 is fixed on the rotating shaft R1.

When the flexible display screen 10 is gradually received into the accommodating housing 20, the flexible display screen 10 can be gradually rotated and wound on the rotating shaft R1. When the flexible display screen 10 is gradually extended out from the accommodating housing 20, the flexible display screen 10 is gradually released and expanded from the rotating shaft R1.

Wherein, as shown in FIG. 3 or FIG. 4, the flexible display screen 10 further includes an operating lever 110 located at the outermost side of the flexible display screen 10, the operating lever 110 is configured to extend the flexible display screen 10 out from the accommodating housing 20. In other embodiments, the flexible display device 100 of the present disclosure can further include an expansion driving mechanism configured to drive the flexible display screen 10 to automatically extend out from the accommodating housing 20, and the unfolding speed of the flexible display screen 10 driven by the expansion driving mechanism can be uniform or variable.

Therein, the flexible display device 100 can further include a reset mechanism (not shown in the figure), which is configured to drive the flexible display 10 to received into the accommodating housing 20 and wound on the rotating shaft R1.

Figure 8:
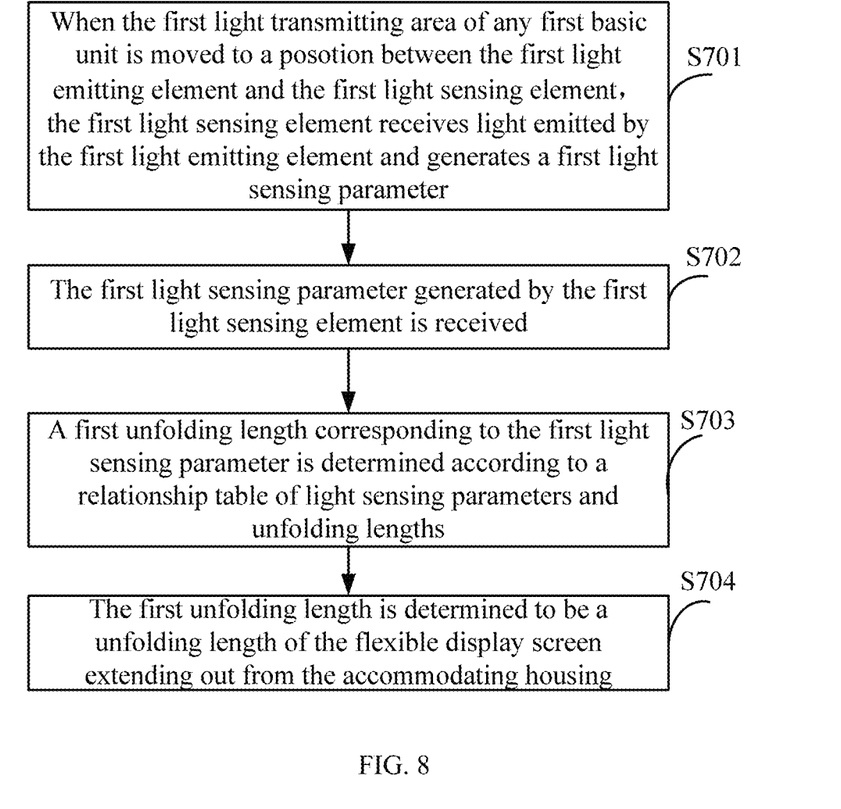
FIG. 8 is a flowchart of an unfolding detection method of a flexible display in accordance with one embodiment of the present disclosure.

Referring to FIG. 8, a flowchart of an unfolding detection method of a flexible display of the present disclosure. The unfolding detection method is configured to detect the unfolding length of the flexible display screen 10 of the flexible display device 100 mentioned above. the flexible display device 100 includes a first light emitting element F1 and a first light sensing element G1 disposed at corresponding positions of the flexible display device 100. The flexible display screen 10 is provided with a plurality of first basic units 10 arranged along the unfolding direction of the flexible display screen 10, and each of the first basic unit 101 includes a first light transmitting area A1 with an area different from any other area of any other first basic unit 101. The method includes steps of:

When the first light transmitting area A1 of any first basic unit 101 is moved to a position between the first light emitting element F1 and the first light sensing element G1, the first light sensing element G1 receives light emitted by the first light emitting element F1 and generates a first light sensing parameter (S701).

The first light sensing parameter generated by the first light sensing element G1 is received (S702).

A first unfolding length corresponding to the first light sensing parameter is determined according to a relationship table of light sensing parameters and unfolding lengths (S703). Specifically, the relationship table of light sensing parameters and unfolding lengths includes a relationship between the light sensing parameters, the parameter ranges, and the unfolding lengths. The step S702 includes: determining the light sensing parameter range of the first light sensing parameter according to the received light sensing parameter, and further determining the corresponding first unfolding length according to the light sensing parameter range.

The first unfolding length is determined to be the unfolding length of the flexible display screen 10 extending out from the accommodating housing 20.

Figure 9:
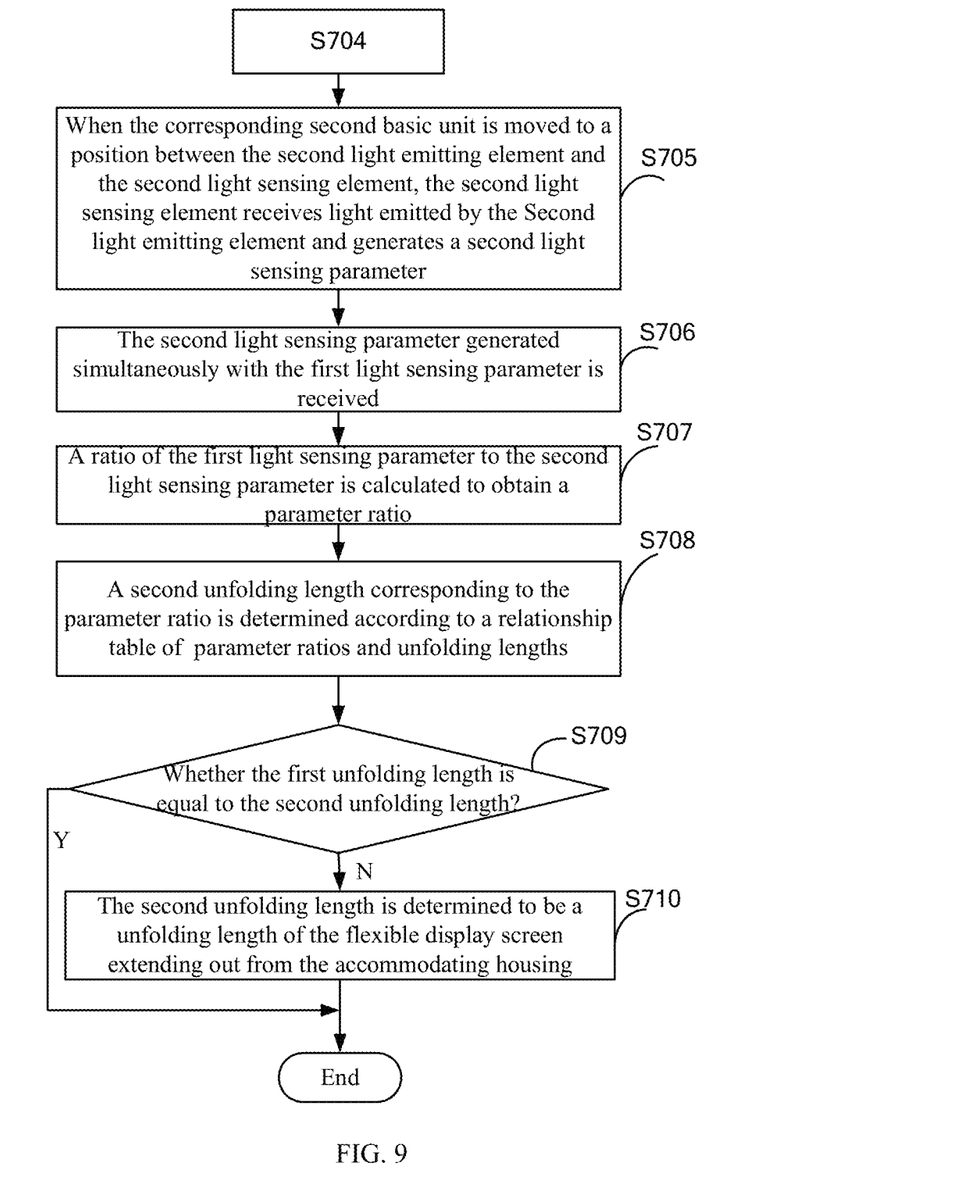
FIG. 9 is a flowchart of supplementary steps for the unfolding detection method as shown in FIG. 8.

Referring to FIG. 9, FIG. 9 is a flowchart of a supplementary step of the flowchart shown in FIG. 8. The flexible display device 100 further includes a second light emitting element F2 and a second light sensing element G2 disposed at corresponding positions of the accommodating housing 20. The flexible display screen 10 further includes a plurality of second basic units 102 corresponding to and parallel to the plurality of first basic units 101, each of the second basic units 102 including a second light transmitting area Q1 and the sizes of all the second light transmitting areas Q1 being the same. As shown in FIG. 8, the method further includes the steps of:

When the corresponding second basic unit 102 is moved to a position between the second light emitting element F2 and the second light sensing element G2, the second light sensing element G2 receives light emitted by the second light emitting element F2 and generates a second light sensing parameter (S705).

The second light sensing parameter generated simultaneously with the first light sensing parameter is received (S706).

A ratio of the first light sensing parameter to the second light sensing parameter is calculated to obtain a parameter ratio (S707).

An second unfolding length corresponding to the parameter ratio according to a relationship table of parameter ratios and unfolding lengths is determined (S708).

The unfolding length D1 is compared with the unfolding length D2 to determine whether the first unfolding length is equal to the second unfolding length or not (S709). If yes, the process ends; if not, step S710 is executed.

The second unfolding length is determined to be an unfolding length of the flexible display screen 10 extending out from the accommodating housing 20 (S710).

Therein, in some embodiments, the method further includes the steps of:

The first light sensing parameter generated by the first light sensing element G1 and the unfolding length of the current flexible display screen 10 can be measured, each time the first light transmitting area A1 of each first basic unit 101 passes through the first light sensing element G1, thus, the relationships between different light sensing parameters and different unfolding lengths are determined one by one, and the relationship table T1 is formed accordingly.

Therein, in some embodiments, the method further includes the steps of:

The parameter ratio of the first light sensing parameter generated by the first light sensing element G1 to the second light sensing parameter generated by the second light sensing element G2, and the unfolding length of the current flexible display screen 10 can be measured each time when the first light transmitting area A1 of each first basic unit 101 passes through the first light sensing element Gland the second light transmitting area Q1 of each second basic unit 102 passes through the second light sensing element G2, thus, the relationships between parameter ratios and unfolding lengths are determined one by one, and the relationship table is formed accordingly.

In some embodiments, the method further includes the steps of:

A size of the visible display area/unfolding area of the flexible display screen 10 is determined according to the unfolding length of the current flexible display screen 10, and a size of a display content is adjusted to match the size of the currently visible display area.

Figure 10:
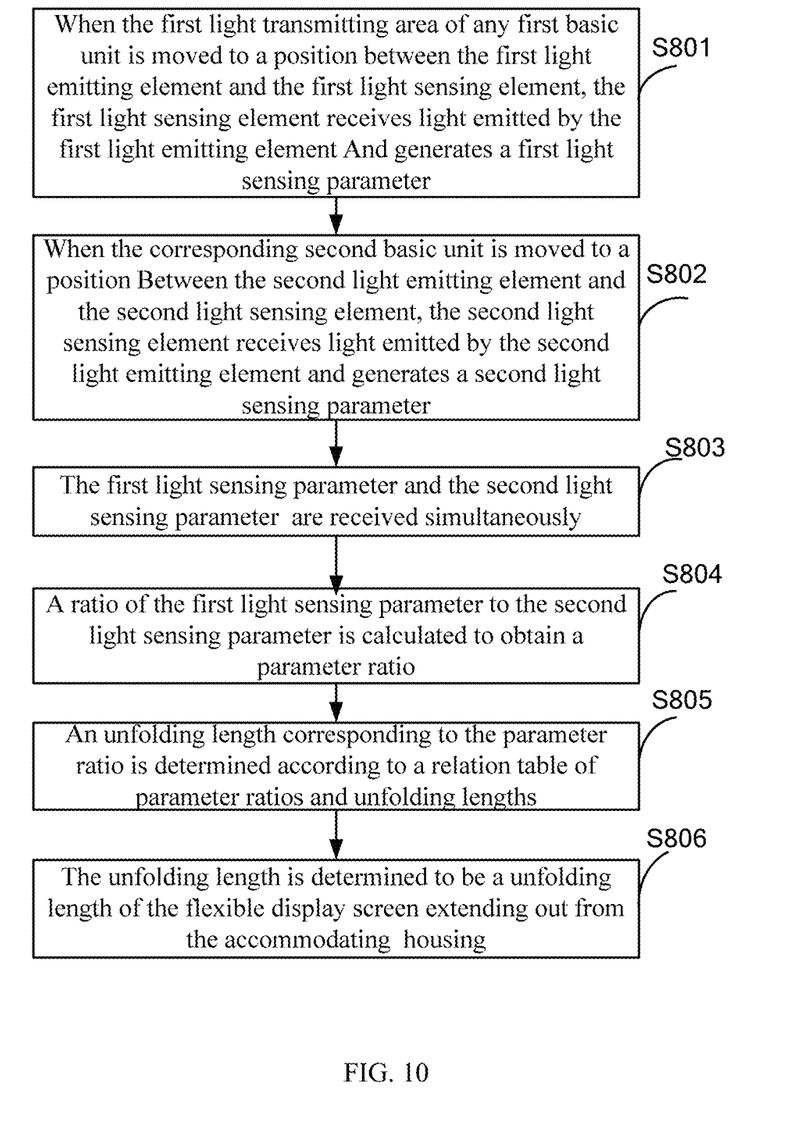
FIG. 10 is a flowchart of an unfolding detection method of a flexible display in accordance with another embodiment of the present disclosure.

Referring to FIG. 10, a flowchart of an unfolding detection method of another embodiment of the present disclosure. The unfolding detection method is configured to detect the unfolding length of the flexible display screen 10 of the flexible display device 100. Therein, the flexible display device 100 includes a first light emitting element F1 and a first light sensing element G1 disposed at corresponding positions of the accommodating housing 20 of the flexible display device 100, and further includes a second light emitting element F2 and a second light sensing element G2 disposed at corresponding positions of the accommodating housing 20 of the flexible display device 100. The flexible display screen 10 includes a plurality of first basic units 101 along an unfolding direction of the flexible display screen 10 and spaced apart from each other and a plurality of second basic units 102 corresponding to the plurality of first basic units 101, each of the first basic unit 101 includes a first light transmitting area A1 with an area different from any other area of any other first basic unit 101, and each of the second basic unit 102 includes a second light transmitting area Q1 and the sizes of all the second light transmitting areas being the same. The method comprises steps of:

When the first light transmitting area A1 of any first basic unit 101 is moved to a position between the first light emitting element F1 and the first light sensing element G1, the first light sensing element G1 receives light emitted by the first light emitting element F1 and generates a first light sensing parameter (S801).

When the corresponding second basic unit 102 is moved to a position between the second light emitting element F2 and the second light sensing element G2, the second light sensing element G2 receives light emitted by the second light emitting element F2 and generates a second light sensing parameter (S802).

The first light sensing parameter and the second light sensing parameter are received Simultaneously (S803).

A ratio of the first light sensing parameter to the second light sensing parameter is calculated to obtain a parameter ratio (S804).

An unfolding length corresponding to the parameter ratio according to a relationship table of parameter ratios and unfolding lengths is determined (S805).

The unfolding length is determined to be an unfolding length of the flexible display screen 10 extending out from the accommodating housing 20 (S806).

Therein, in some embodiments, the method further includes the steps of:

The parameter ratio of the first light sensing parameter generated by the first light sensing element G1 to the second light sensing parameter generated by the second light sensing element G2, and the unfolding length of the current flexible display screen 10 can be measured, each time when the first light transmitting area A1 of each first basic unit 101 passes through the first light sensing element Gland the second light transmitting area Q1 of each second basic unit 102 passes through the second light sensing element G2. Thus, the relationships between parameter ratios and unfolding lengths are determined one by one, and the relationship table is formed accordingly.

In some embodiments, the method further includes the steps of:

A size of a visible display area/unfolding area of the flexible display screen 10 is determined according to the unfolding length of the current flexible display screen 10, and a size of a display content is adjusted to match the size of the currently visible display area.

In the flexible display device 100 and the unfolding detection method of the present disclosure, when the flexible display screen 10 is moved to different positions between the first light emitting element F1 and the first light sensing element G1, the first light sensing element G1 receives different amounts of light by setting different areas of the first light transmitting areas A1, and generates different light sensing parameters, thereby indicating different unfolding lengths of the flexible display screen 10. Further, in the flexible display device 100 and the unfolding detection method of the present disclosure, by setting the second light transmitting area Q1 of the second basic unit 102 as a reference, when the second basic unit 102 corresponding to the first basic unit 101 is moved to a position corresponding to the second light sensing element G2, the second light sensing element G2 generates the second light sensing parameter and a parameter ratio is obtained by calculating a ratio of the first light sensing parameter and the second light sensing parameter. Thus, by determining the unfolding length according to the parameter ratio, the influence of pulling or shrinking speed of the flexible display screen 10 is avoided, and the detection accuracy is further improved.

The above is a preferred embodiment of the present disclosure, and it should be noted that those skilled in the art may make some improvements and modifications without departing from the principle of the present disclosure, and these improvements and modifications are also the protection scope of the present disclosure.

What is claimed is:

1. A flexible display device, comprising a flexible display screen, an accommodating housing and a processor, the flexible display screen extending out from the accommodating housing or receiving in the accommodating housing, wherein, the flexible display device further comprises a first light emitting element and a first light sensing element, the first light emitting element and the first light sensing element disposed, opposite to each other, in the accommodating housing;

the flexible display screen comprises a plurality of first basic units arranged along an unfolding direction of the flexible display screen and spaced apart from each other, each of the first basic units comprising a first light transmitting area with an area different from any other area of any other first basic unit; when any first light transmitting area moves with the flexible display screen and passes through the first light emitting element and the first light sensing element, the first light transmitting area is located between the first light emitting element and the first light sensing element; the first light sensing element senses light emitted by the first light emitting element passing through the first light transmitting area and generates a first light sensing parameter;

the flexible display device further comprises a second light emitting element and a second light sensing element, the second light emitting element and the second light sensing element are disposed, opposite to each other, on the accommodating housing;

the flexible display screen further comprises a plurality of second basic units along an unfolding direction of the flexible display screen and spaced apart from each other, each second basic unit comprises a second light transmitting area and sizes of all the second light transmitting areas are the same; the plurality of second basic units correspond to the plurality of first basic units one by one and are arranged in parallel with the unfolding direction of the flexible display screen; when any one of the second light transmitting areas pass through the second light emitting element and the second light sensing element with the flexible display screen moving, the second light transmitting area is located between the second light emitting element and the second light sensing element the second light sensing element senses light emitted by the second light emitting element and passed through the second light transmitting area and generates a second light sensing parameter;

the processor is coupled to the first light sensing element for receiving the first light sensing parameter and coupled to the second light sensing element for receiving the second light sensing parameter; the processor determines an unfolding length of the flexible display screen extending out from the accommodating housing according to the first light sensing parameter and the second light sensing parameter.

2. The flexible display device according to claim 1, wherein, areas of the first light transmitting areas of the plurality of first basic units differ in ascending or descending order along the unfolding direction of the flexible display screen, or differ without sequence.

3. The flexible display device according to claim 1, wherein, the processor determines a first unfolding length corresponding to the first light sensing parameter according to a preset first relationship table of light sensing parameters; the processor calculates a ratio of the first light sensing parameter to the second light sensing parameter to obtain a parameter ratio according to the second light sensing parameter and the first light sensing parameter received simultaneously, and further determines a second unfolding length corresponding to the parameter ratio according to a relationship table of the parameter ratios and unfolding lengths; the processor compares the first unfolding length with the second unfolding length to determine whether the first unfolding length is equal to the second unfolding length or not; if yes, the first unfolding length is determined to be the unfolding length of the flexible display screen extending out from the accommodating housing; if not, the second unfolding length is determined to be the unfolding length of the flexible display screen extending out from the accommodating housing.

4. The flexible display device according to claim 3, wherein, the plurality of first basic units are arranged on the first edge of the flexible display screen, the plurality of second basic units arranged in parallel with the plurality of first basic units on the first edge, or arranged on the second edge opposite to the first edge of the flexible display screen.

5. The flexible display device according to claim 4, wherein, the accommodating housing comprises an opening, the flexible display screen extending out from or receiving into the accommodating housing through the opening; the first light emitting element and the first light sensing element are disposed, opposite to each other, on a first side and a second side of the opening respectively; the second light emitting element and the second light sensing element are also disposed, opposite to each other, on the first side and the second side of the opening respectively.

6. The flexible display device according to claim 5, wherein, the first light emitting element and the first light sensing element are respectively disposed at first ends of the first side and the second side of the opening, the second light emitting element and the second light sensing element respectively arranged at the first ends of the first side and the second side of the opening or respectively arranged at second ends of the first side and the second side of the opening, the second ends being opposite to the first ends.

7. The flexible display device according to claim 4, wherein, the accommodating housing further comprises a winding-shape accommodating passage located within the accommodating housing, the flexible display screen being accommodated into the accommodating housing through the accommodating passage; the first light emitting element and the first light sensing element are disposed, opposite to each other, on first sides of two opposite surfaces of the accommodating passage; the second light emitting element and the second light sensing element are respectively arranged in parallel with the first light emitting element and the first light sensing element, opposite to each other, on the first sides of opposite surfaces, or disposed on the second sides opposite to the first side of the opposite surfaces.

8. The flexible display device according to claim 1, wherein, the first light emitting element and the second light emitting element are light emitting diodes or laser diodes; the emitted light is infrared light or visible light; the first light sensing element and the second light sensing element are photo diodes; and the first light sensing parameters and the second light sensing parameters are current parameters or voltage parameters.

9. The flexible display device according to claim 1, wherein, each first light transmitting area of each first basic unit and each second light transmitting area of each second basic unit are made of transparent materials including a transparent plastic material and a transparent resin material, or formed by perforating holes.

10. A flexible display device, comprising a flexible display screen, an accommodating housing and a processor, the flexible display screen extending out from the accommodating housing or receiving in the accommodating housing, wherein, the flexible display further comprises a first light emitting element, a second light emitting element, a first light sensing element and a second light sensing element; the first light emitting element and the first light sensing element disposed, opposite to each other, in the accommodating housing, and the second light emitting element and the second light sensing element are also disposed at another two corresponding positions of the accommodating housing;

the flexible display screen comprises a plurality of first basic units arranged along an unfolding direction of the flexible display screen and spaced apart from each other and a plurality of second basic units corresponding to the plurality of first basic units; each of the first basic units comprising a first light transmitting area with an area different from any other area of any other first basic unit; each of the second basic units comprising a second light transmitting area with an area same with any other area of any other second basic unit;

wherein, when any first light transmitting area of the first basic unit is located between the first light emitting element and the first light sensing element, the second light transmitting area of the second basic unit corresponding to the first basic unit is also located between the second light emitting element and the second light sensing element; the first light sensing element senses light emitted by the first light emitting element and passed through the first light transmitting area and generates a first light sensing parameter, and the second light sensing element senses light emitted by the second light emitting element and passed through the second light transmitting area and generates a second light sensing parameter;

the processor is coupled to the first light sensing element and the second light sensing element, and is configured to receive the first light sensing parameter generated by the first light sensing element and the second light sensing parameter generated by the second light sensing element; the processor calculates a ratio of the first light sensing parameter to the second light sensing parameter to obtain a parameter ratio, and further determines an unfolding length corresponding to the parameter ratio according to a relationship table of parameter ratios and unfolding lengths, thereby determining that an unfolding length of the flexible display screen extending out from the accommodating housing to be the unfolding length.

11. The flexible display device according to claim 10, wherein, the plurality of first basic units are arranged on the first edge of the flexible display screen, the plurality of second basic units arranged in parallel with the plurality of first basic units on the first edge, or arranged on the second edge opposite to the first edge of the flexible display screen.

12. The flexible display device according to claim 11, wherein, the accommodating housing further comprises a winding-shape accommodating passage located in the accommodating housing, the flexible display screen received within the accommodating housing through the accommodating passage; the first light emitting element and the first light sensing element disposed, opposite to each other, on first sides of opposite surfaces of the accommodating passage; the second light emitting element and the second light sensing element are respectively arranged in parallel with the first light emitting element and the first light sensing element, opposite to each other, on the first sides of opposite surfaces, or disposed opposite to each other, on second sides of the opposite surfaces, the first sides being opposite to the second sides.

13. The flexible display device according to claim 11, wherein, the accommodating housing comprises an opening; the flexible display screen can extending out from or receiving into the accommodating housing through the opening; the first light emitting element and the first light sensing element are disposed, opposite to each other, on a first side and a second side of the opening respectively; the second light emitting element and the second light sensing element are also disposed, opposite to each other, on the first side and the second side of the opening respectively.

14. The flexible display device according to claim 13, wherein, the first light emitting element and the first light sensing element are respectively disposed at first ends of the first side and the second side of the opening, the second light emitting element and the second light sensing element respectively arranged at the first ends of the first side and the second side of the opening or are respectively arranged at second ends of the first side and the second side of the opening, the second ends being opposite to the first ends.

15. The flexible display device according to claim 10, wherein, the first light emitting element and the second light emitting element are light emitting diodes or laser diodes, the emitted light is infrared light or visible light; the first light sensing element and the second light sensing element are photo diodes; and the first light sensing parameters and the second light sensing parameters are current parameters or voltage parameters.

16. The flexible display device according to claim 15, wherein, each first light transmitting area of each first basic unit and each second light transmitting area of each second basic unit are made of transparent materials including a transparent plastic material and a transparent resin material or formed by perforating holes.

17. An unfolding detection method, configured to detect a unfolding length of a flexible display screen of a flexible display device; wherein, the flexible display device comprises a first light emitting element and a first light sensing element disposed, opposite to each other, in the flexible display device; the flexible display screen is provided with a plurality of first basic units arranged along a unfolding direction of the flexible display screen, and each of the first basic units comprising a first light transmitting area with an area different from any other area of any other first basic unit; the flexible display device further comprises a second light emitting element and a second light sensing element disposed, opposite to each other, in the flexible display device; the flexible display screen further comprises a plurality of second basic units corresponding to the plurality of the first basic units; each of the second basic unit comprising a second light transmitting area with an area same with any other area of any other second basic unit the method comprises steps of:

when the first light transmitting area of any first basic unit is moved to a position between the first light emitting element and the first light sensing element, receiving, performed by the first light sensing element, light emitted by the first light emitting element and generating a first light sensing parameter;

when the corresponding second basic unit is moved to a position between the second light emitting element and the second light sensing element, the second light sensing element receives light emitted by the second light emitting element and generates a second light sensing parameter, receiving, performed by the second light sensing element, light emitted by the second light emitting element and generating a second light sensing parameter;

receiving the first light sensing parameter generated by the first light sensing element and the second light sensing parameter generated simultaneously with the first light sensing parameter;

calculating a ratio of the first light sensing parameter to the second light sensing parameter to obtain a parameter ratio;

determining an unfolding length corresponding to the parameter ratio according to a relationship table of parameter ratios and unfolding lengths;

determining the unfolding length as an unfolding length of the flexible display screen extending out from the accommodating housing.

18. The unfolding detection method according to claim 17, wherein, the method further comprises the steps of:

measuring the parameter ratio of the first light sensing parameter generated by the first light sensing element to the second light sensing parameter generated by the second light sensing element, and measuring the unfolding length of the current flexible display screen, each time the first light transmitting area of each first basic unit and the second light transmitting area of the corresponding second basic unit passes through the first light sensing element and the second light sensing element respectively, thereby acquiring the relationship table of parameter ratios and unfolding lengths by determining relationships between different parameter ratios and different unfolding lengths one by one.

\* \* \* \* \*